(12) United States Patent
Piper et al.

(10) Patent No.: US 10,459,141 B2
(45) Date of Patent: Oct. 29, 2019

(54) COLLECTION AND GUIDING OF AMBIENT LIGHT TOWARDS DISPLAY LAYER

(71) Applicant: HEWLETT-PACKARD DEVELOPMENT COMPANY, L.P., Houston, TX (US)

(72) Inventors: Shawn Piper, Houston, TX (US); Michael W. Hu, Houston, TX (US); Brian Spate, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,343

(22) PCT Filed: Jan. 31, 2017

(86) PCT No.: PCT/US2017/015832
§ 371 (c)(1),
(2) Date: Aug. 8, 2018

(87) PCT Pub. No.: WO2018/143941
PCT Pub. Date: Aug. 9, 2018

(65) Prior Publication Data
US 2019/0041566 A1    Feb. 7, 2019

(51) Int. Cl.
*F21V 8/00* (2006.01)
*G02F 1/1335* (2006.01)
*G04G 9/00* (2006.01)

(52) U.S. Cl.
CPC ........... *G02B 6/002* (2013.01); *G02B 6/0028* (2013.01); *G02F 1/133528* (2013.01);
(Continued)

(58) Field of Classification Search
CPC ..... G02B 6/002; G02B 6/0028; G04G 9/0005
See application file for complete search history.

(56) References Cited

U.S. PATENT DOCUMENTS 6,254,245 B1   7/2001   Uehara
6,258,429 B1   7/2001   Nelson
(Continued)

FOREIGN PATENT DOCUMENTS

EP          1780990 A1     5/2007

OTHER PUBLICATIONS

"Ambient Light Adaptive LED Driver", National Semiconductor Corporation, Retrieved from internet—http://www.ti.com/it/ug/snvu113/snvu113.pdf, Nov. 2008, 13 Pages.
(Continued)

*Primary Examiner* — Joseph L Williams
(74) *Attorney, Agent, or Firm* — Michael A Dryja

(57) ABSTRACT

An apparatus include a housing having a top opening, and a sidewall and a bottom surface defining a cavity. The apparatus includes a display assembly. The display assembly includes an electronic transmissive display layer within the cavity to display an image viewable from the top opening of the housing. The display assembly includes a light collector within the cavity and having an optical opening at the top opening of the housing to collect ambient light. The display assembly includes a light guide layer within the cavity to guide the collected ambient light towards and through the display layer. The apparatus includes a processing device within the cavity to generate data to display using the display layer.

16 Claims, 4 Drawing Sheets

(52) U.S. Cl.
CPC ............. *G04G 9/00* (2013.01); *G04G 9/0005* (2013.01); *G04G 9/0035* (2013.01); *G02F 1/133606* (2013.01); *G02F 2001/133618* (2013.01); *G02F 2201/56* (2013.01); *G02F 2203/01* (2013.01)

(56) References Cited

U.S. PATENT DOCUMENTS

| | | |
|---|---|---|
| 6,369,866 B1 | 4/2002 | Rai et al. |
| 7,853,288 B2 | 12/2010 | Ma |
| 8,228,463 B2 | 7/2012 | Biemath et al. |
| 9,429,699 B2 | 8/2016 | Chen et al. |
| 2003/0201702 A1 | 10/2003 | Kim et al. |
| 2008/0259067 A1 | 10/2008 | Wang et al. |
| 2008/0266850 A1 | 10/2008 | Masri |
| 2010/0309412 A1 | 12/2010 | Paul |
| 2014/0125920 A1 | 5/2014 | Hu et al. |

OTHER PUBLICATIONS

"FAQs-Trailer Lighting", Gooseneck Trailer Inc., Retrieved from Internet—http://blog.gooseneck.net/2016/04/faqs-trailer-lighting, Apr. 25, 2016, 4 Pages.

"Sunlight Readability", JACO Displays, Retrieved from Internet—http://www.jacodisplays.com/display-solutions/sunlight-readability, 2014, 3 Pages.

"Trijicon TriPower", Retrieved from internet—https://www.trijicon.com/na_en/products/product1.php?id=TriPower, Mar. 21, 2015, 1 Page.

Turgut, "Changing Direction: Luminit's Problem Solving Direction Turning Films", Luminit, Retrieved from Internet—http://www.luminitco.com/light-turning-film, Mar. 3, 2016, 4 Pages.

COLLECTION AND GUIDING OF AMBIENT LIGHT TOWARDS DISPLAY LAYER

BACKGROUND

In the context of consumer electronics, a wearable device is a device that is worn by a user and that include smart electronics. Examples include smart watches, as well activity and health trackers that include bands that can be strapped to users' wrists like regular wristwatches. For instance, besides providing the ability to "tell time," a smart watch may also link to a user's smartphone, and permit the user to answer, dismiss, and make phone calls, as well as display information to the user and receive limited input from the user. A user can thus use a smart watch as an extension of or accessory to his or her smartphone. A smart watch may also have activity or health tracking functionality like an activity or health tracker, tracking the number of steps a user takes, the user's heart rate, and so on. This collected information may be periodically transmitted from the smart watch to a user's smartphone, or to another device, such as over a network.

DETAILED DESCRIPTION

As noted in the background section, wearable devices are devices that users wear and that include smart electronics. Wearable devices are thus often used in outdoor environments, including in sunny conditions. Electronic displays of wearable devices, such as smart watches and other wrist-worn devices, are often difficult to view under high ambient light conditions like direct sunlight. Smart watches that include analog watch mechanisms can more particularly suffer from this issue.

Within such a smart watch, the analog watch mechanism, including the hour and minute hands, resides within an air gap between a surface on which the mechanism is mounted and a protective cap, which can be convex. The electronic display is visible through the surface at which the analog watch mechanism is mounted. As a result, there are multiple surfaces that can reflect light, and further there is often an optical impedance mismatch between the air gap and the material of the protective cap, in addition to the non-flat nature of the cap causing differing refraction of light.

Such a wearable device thus cannot benefit from solutions that may be employed with other types of devices like smartphones. For instance, a smartphone may have a flat protective layer disposed directly against its electronic display. There is no optical impedance mismatch because there is no air gap between the display and the protective layer. Differing light refraction does not occur because the protective layer is flat, or planar.

Another solution that is used in smartphones, laptop computers, and other portable electronic devices that have relatively large batteries is active highbrighting. Active highbrighting involves adding high luminescence light-emitting diodes (LEDs) or other light sources within the backlight of an electronic display. When a photosensor detects that the ambient light is high, the active highbrighting mechanism is turned on to supplement the backlight of the display and to increase the display's contrast. This solution also is unworkable in wearable devices like smart watches, because even the addition of a small number of high luminescence LEDs can adversely affect battery life, since smart watches have relatively small batteries.

Techniques described herein ameliorate these shortcomings by effectively employing the ambient light itself as a passive highbrighting mechanism. No sensor is needed to "turn on" the mechanism, because the amount of backlight provided corresponds to the amount of ambient light available. No power is required, because the mechanism is entirely passive. Ambient light is collected from above a device like a wearable device, and redirected towards and through the display's electronic display that provides an image viewable from above the device.

Figure 1:
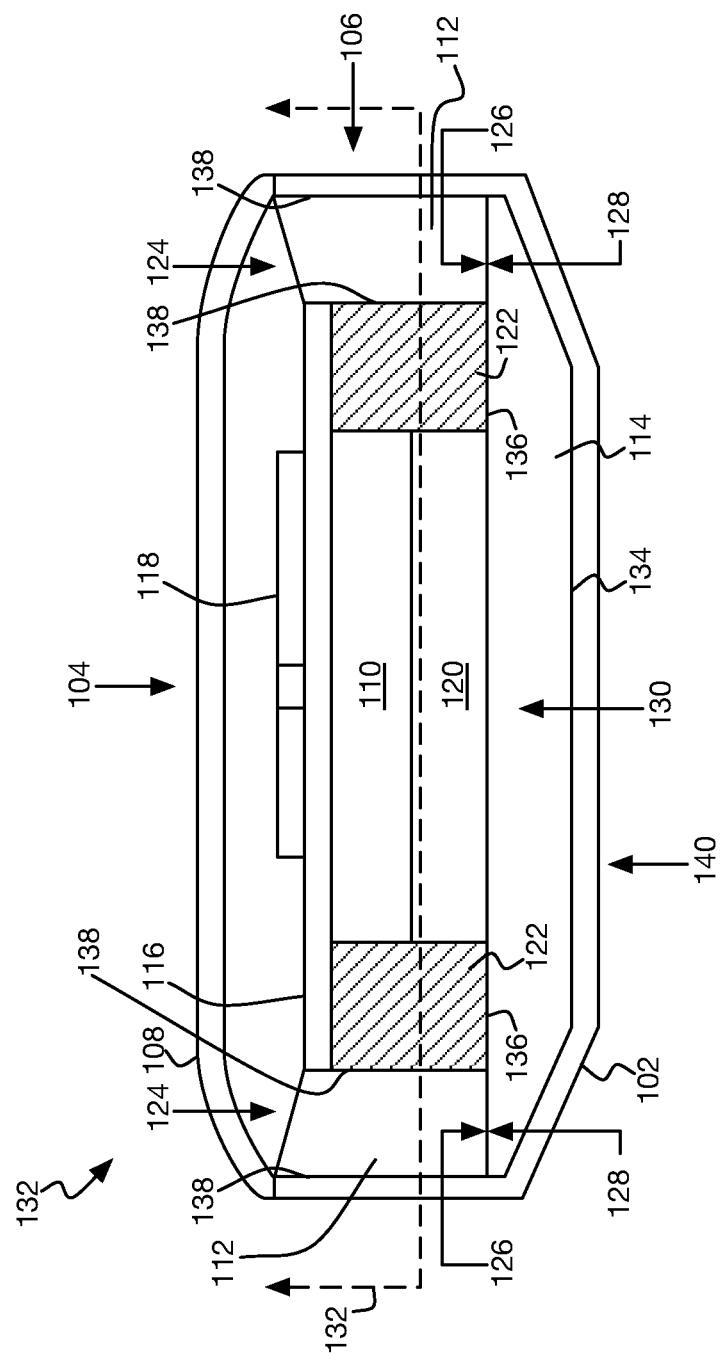
FIG. 1 is a diagram of a cross-sectional view of a device.
Figure 2:
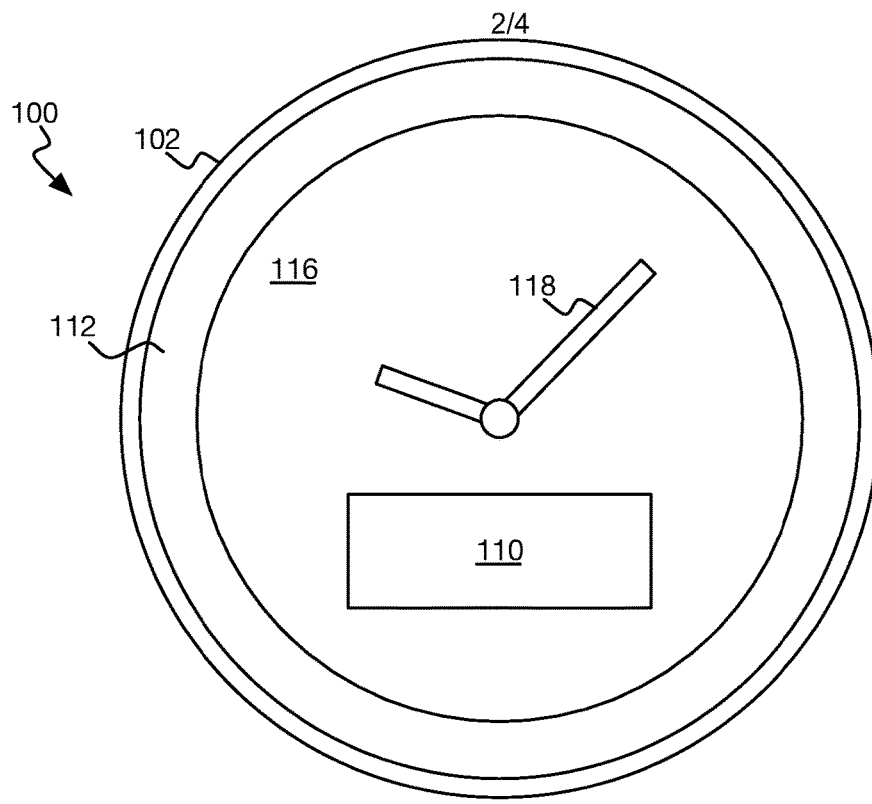
FIG. 2 is a diagram of a top view of the device of FIG. 1.
Figure 3:
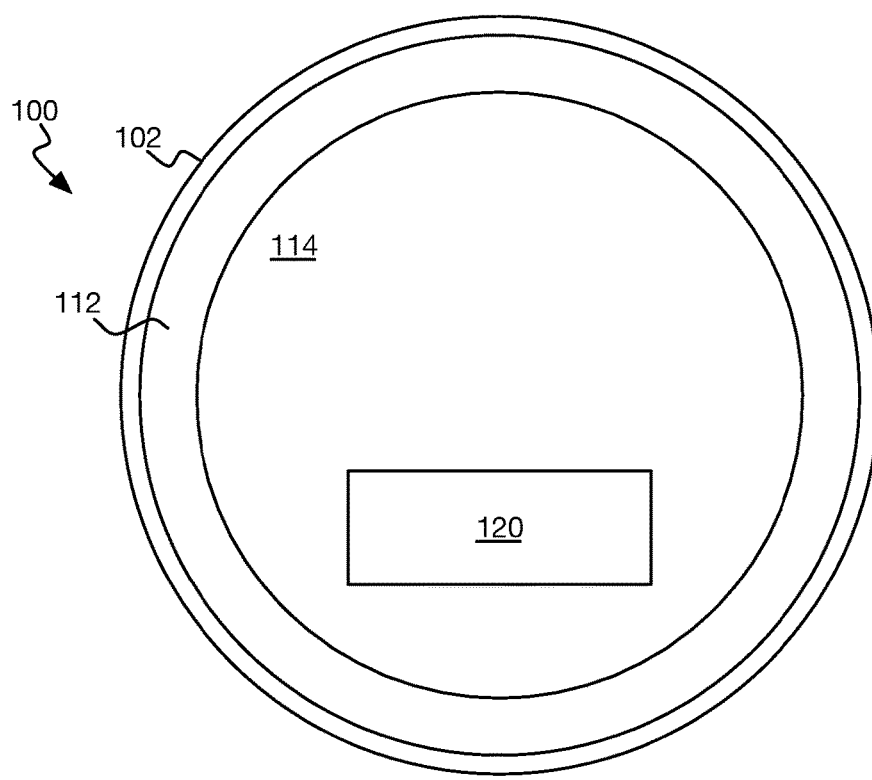
FIG. 3 is a diagram of a top cross-sectional view of the device of FIG. 1.

FIG. 1 is a cross-sectional view of an example device 100. FIG. 2 is a top view of example the device 100 as visible through a protective cap 108. FIG. 3 is a cross-sectional top view of the example device 100 at a cross-sectional line 132, with electronics 122 removed. The device 100 is depicted in FIGS. 1, 2, and 3 as a wearable device, specifically a smart watch. However, the techniques described herein are applicable in relation to other types of wearable devices, as well as to types of devices other than wearable devices.

The device 100 includes a housing 102. The housing 102 has a top opening 104, a sidewall 106, and a bottom wall 140. The sidewall 106 and the bottom wall 140 define a cavity accessible through the top opening 104. The housing 102 can be manufactured from a rigid opaque material, such as metal, plastic, glass, and so on. As depicted in FIGS. 2 and 3, the housing 102 can have a round or circular shape. The housing 102 can in another implementation have a square, rectangular, or triangular shape, in which case there is more than sidewall 106.

The device 100 can include a transparent protective cap 108 extending over the top opening 104 of the housing 102 interiorly adjacent to the sidewall 106. The protective cap 108 may be convex in shape as depicted in FIG. 1. The protective cap 108 can be manufactured from a rigid transparent material, such as glass or plastic.

The device 100 includes an electronic transmissive display layer 110 disposed within the cavity of the housing 102. The display layer 110 displays an image viewable from the top opening 104 of the housing 102. That is, the display layer 110 displays an image viewable from above the display layer 110. The display layer 110 can be a transmissive display like an electronically controlled transmissive liquid crystal display (LCD) layer. For instance, liquid crystals within such a display layer 110 can be individually turned on and off in correspondence with pixels of an image to be displayed, and light transmitted from below and through the display layer 110 accordingly absorbed by the liquid crystals to form a displayed image.

The display layer 110 may be a passive display layer, such as a passive LCD, in that there is no active backlight within the device 100. That is, there may be no backlight or other active light source powered by a power source, such as a battery, within the device 100 for the display layer 110. Such a passive display layer 110 means that just ambient light is used to permit an image displayed by the layer 110 to be viewed. The display layer 110 can still be transmissive, in that ambient light is transmitted through the display layer 110 to render the image visible. In this respect, a transmissive display layer 110 is contrasted with a reflective display layer, which relies upon light reflected from above (i.e., from the same side of the display layer at which the image is to be viewed) to be visible.

The device 100 includes a light collector 112 within the cavity of the housing 102 and around the display layer 110. The light collector 112 has an optical opening 124 at the top opening 104 of the housing 102 to collect ambient light from above the display layer 110 within the environment in which the device 100 is disposed. The light collector 112 has an optical opening 126 opposing the optical opening 124. Internal surfaces of sidewalls 138 of the light collector 112 between the optical openings 124 and 126 are reflective, and can be of a maximally reflective material to better capture ambient light. As such, the opening 124 of the sidewalls 138 is optically open to the ambient environment to collect ambient light within the environment, and the opening 126 of the sidewalls 138 outputs this collected ambient light. The optical opening 124 can be disposed outside a perimeter of the display layer 110, adjacent to an interior perimeter of the housing 102.

The device 100 includes a light guide layer 114 within the cavity of the housing 102 and below the display layer 110. The light guide layer 114 can be positioned at a bottom surface of the housing 102. The light guide layer 114 guides the ambient light collected by the light collector 112 towards and through the display layer 110. The light guide layer 114 has an optical opening 128 in optical connection with and adjacent to the optical opening 126 of the light collector 112 at which the collected ambient light is received, and has an optical opening 130 in optical connection with the display layer 110, towards which the collected ambient light is guided, and at which the guided ambient light is output. A bottom wall 134 of the light guide layer 114, and a top wall 136 of the light guide layer 114 between the optical openings 128 and 130, having internal reflective surfaces, and can be of a maximally reflective material to better guide the collected ambient light from the optical opening 128 to the optical opening 130.

The device 100 can include a one-way optical film 116 at the top opening 104 of the housing 102 interiorly adjacent to the light collector 112. The one-way optical film 116 covers the top opening 104 except where the optical opening 124 of the light collector 112 is situated. The one-way optical film 116 permits light to be transmitted upwards in FIG. 1 but not downwards. Therefore just light transmitted through the display layer 110 exits the one-way optical film 116. Incoming ambient light from above the protective cap 108 is absorbed by the optical film 116, effectively rendering any electronics 122 disposed under the optical film 116 visibly hidden.

The device 100 can include a watch mechanism 118. The watch mechanism 118 can include analog hour and minute hands, for instance. The protective cap 108 protects the watch mechanism 118 from mechanical damage. The watch mechanism 118 is disposed above the one-way optical film 116, and may having a high-contrast or reflective coating. The presence of the optical film 116, which absorbs light from above, promotes visibility of the watch mechanism 118.

The device 100 can include an optical layer 120 within the cavity of the housing 102, between the display layer 110 and the light guide layer 114. The optical layer 120 can be aligned under the display layer 110 and over the optical opening 130 of the light guide layer 114. The optical 120 permits spatially uniform transmission of the collected ambient light from the light guide layer 114 to the display layer 110 that is at an angle no greater that a specified number of degrees relative to a axis perpendicular to the display layer 110 in FIG. 1 (i.e., an axis perpendicular to the surface of the top views of FIGS. 2 and 3), such as forty-five degrees. This transmission of the light is spatially uniform across the plane of FIGS. 2 and 3. An example implementation of the optical layer 120 is described later in the detailed description. The electronic transmissive display layer 110, the light collector 112, the light guide layer 114, and the optical layer 120 can be considered a display assembly of the device 100.

The device 100 can include electronics 122 within the cavity of the housing 102. The electronics 122 can be disposed between the light collector 112 and the display and optical layers 110 and 120. The electronics 122 can be disposed between the one-way optical film 116 and the top wall 136 of the light guide layer 114, and is optically hidden by the optical film 116. The electronics 122 can include a microcontroller, which is more generally a processing device, and a wireless radio, such as a Bluetooth or a Wi-Fi wireless radio. The electronics 122 can include a rechargeable battery to power the processing device and the wireless radio. The electronics 122 can include other components as well, such as a touchscreen, switches or other input device to receive user input, pulse oximeter to measure user pulse, an accelerometer to measure user activity, and so on. The electronics 122 may be disposed in other locations besides that depicted in FIG. 1.

The processing device of the electronics 122 generates data displayed by the display layer 110. The processing device may receive user input from an input device and correspondingly generate the image to display using the display layer 110 from the input. For example, the user may press a touchscreen to cause the processing device to switch from displaying the date on the display layer 110 to displaying a stopwatch or other information. In this respect, the processing device provides the device 100 with "smart" functionality, and encompasses functionality other than direct control of the individual pixels of the display layer 110. That is, the display layer 110 may itself include—or another part of the electronics 122 may include—a display controller that controls power to individual pixels to display data generated by the processing device, and the processing device may not include this display controller.

The processing device of the electronics 122 may receive wirelessly transmitted data from a wireless radio and generate the data displayed using the display layer 110 from this data. For example, the device 100 may be linked to a smartphone via a Bluetooth connection. When an incoming phone call is received at the smartphone, the smartphone may transmit caller identification (ID) information to the device 100, resulting in the processing device displaying this data on the display layer 110. The processing device may further wirelessly transmit data over a wireless radio to the smartphone, such as user activity, user pulse, and other information that the device 100 collects.

Figure 4:
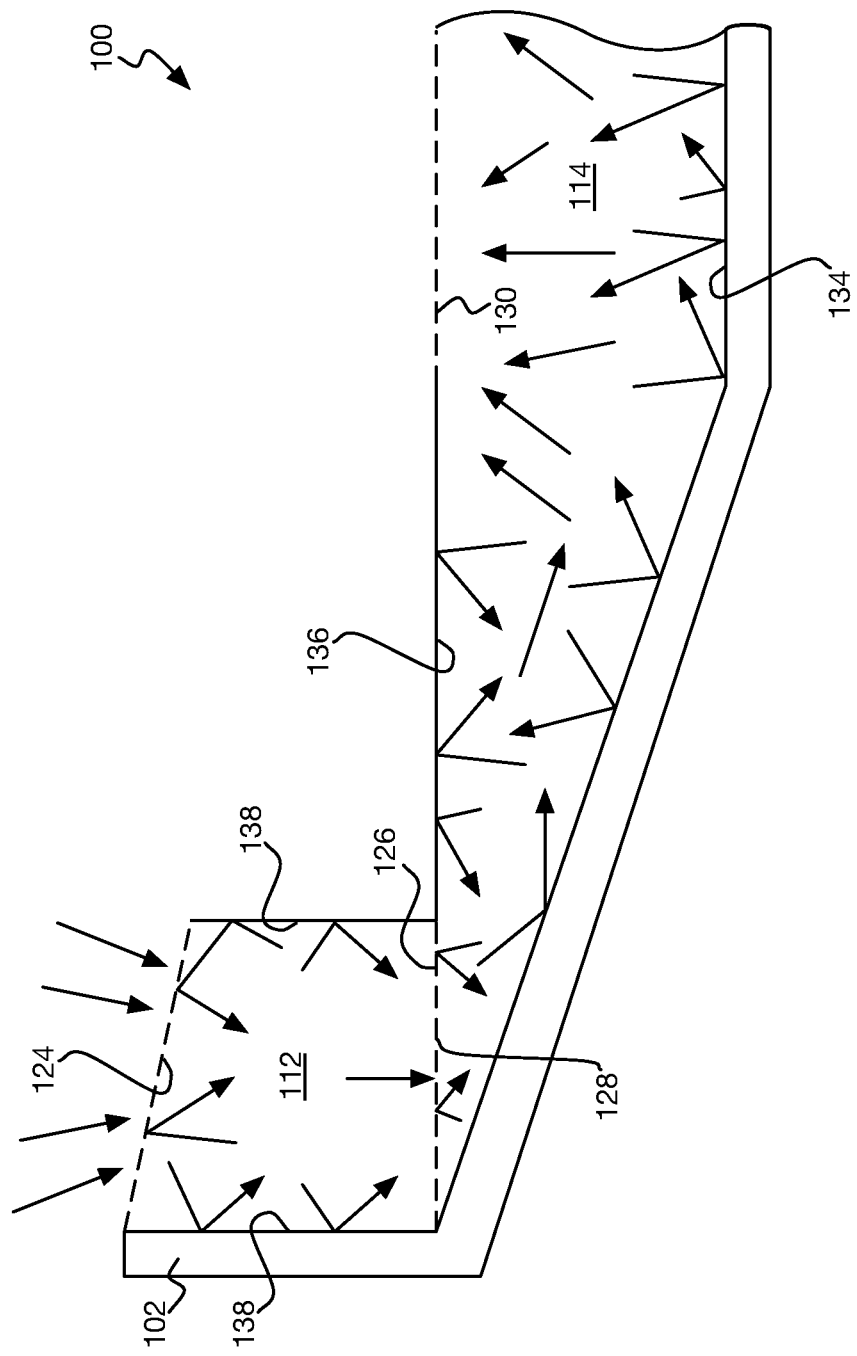
FIG. 4 is a diagram of example ambient light collection and guiding by a light collector and a light guide layer of the device of FIG. 1.

FIG. 4 shows example ambient light collection and guiding by the light collector 112 and the light guide layer 114 of the device 100. For illustrative clarity and convenience, just a left portion of the housing 102, the light collector 112, and the light guide layer 114 are depicted in FIG. 4. Arrows within FIG. 4 represent light rays entering and traveling through the light collector 112, as well as entering and traveling through the light guide layer 114.

Ambient light rays incident to the optical opening 124 of the light collector 112 enter the light collector 112 at the optical opening 124. The optical opening 124 may be a one-way optical opening, in that light rays can enter the optical opening 124 but cannot exit the optical opening 124. For instance, the top of the optical opening 124 may be transmissive, permitting ambient light rays to enter the optical opening 124, but the bottom of the optical opening 124 may be reflective, such that entered ambient light rays incident to the underside of the optical opening 124 are reflected back into the light collector 112.

The internal surfaces of the sidewalls 138 are reflective. Collected light rays within the light collector 112 ultimately exit the light collector 112 at the optical opening 126 thereof. Similar to the optical opening 126, the optical opening 126 may be a one-way optical opening, in that light rays can exit the optical opening 124 but cannot enter the optical opening 126. For instance, the top of the optical opening 126 may be transmissive, permitting collected light rays to exit the optical opening 126, but the bottom of the optical opening 126 may be reflective, such that exited ambient light rays cannot reenter the optical opening 126 at the underside of the optical opening 126.

Therefore, ambient light rays entering the light collector 112 at the optical opening 124 ultimately exit the light collector 112 at the optical opening 126. The light rays may be reflected one or more times by the internal surfaces of the sidewalls 138, and/or by the underside of the optical opening 124, until the light rays finally exit the light collector 112 at the optical opening 126. Other light rays may enter the light collector 112 at the optical opening 124 and immediately proceed to exiting the light collector 112 at the optical opening 126, depending on their direction of entry into the light collector 112.

Upon exiting the light collector 112 at the optical opening 126, the collected light rays enter the light guide layer 114 at the optical opening 128 that is adjacent to and in optical connection with the optical opening 126 of the light collector 112. The optical opening 128 may also be a one-way optical opening, in that light rays can enter the optical opening 128 but cannot exit the optical opening 128. For instance, the top of the optical opening 128 may be transmissive, permitting collected ambient light rays to enter the optical opening 128, but the bottom of the optical opening 128 may be reflective, such that entered collected light rays incident to the underside of the optical opening 128 are reflected back into the light guide layer 114.

The internal surfaces of the bottom wall 134 and of the top wall 136 of the light guide layer are reflective. Light rays within the light guide layer 114 ultimately exit the light guide layer 114 at the optical opening 130 thereof. The optical opening 130 may be a two-way, or bidirectional, optical opening, in that light rays can both exit and enter the optical opening 130. For instance, the bottom of the optical opening 130 may be transmissive, permitting light rays to exit the optical opening 130, and the top of the optical opening 130 may also be reflective, such that exited guided light rays can subsequently reenter the optical opening 130 at the topside of the optical opening 130.

Therefore, collected light rays entering the light guide layer 114 at the optical opening 128 ultimately exit the light guide layer 114 at the optical opening 130. The light rays are reflected one or more times by at least an internal surface of the bottom wall 134, and may also be reflected one or more times by an internal surface of the top wall 136, until the light rays finally exit the light guide layer 114 at the optical opening 130. In this way, the light guide layer 114 guides the collected light rays entering the light guide layer 114 at the optical layer 128 towards the optical opening 130 of the light guide layer 114 at which the now-guided light rays exit.

Figure 5:
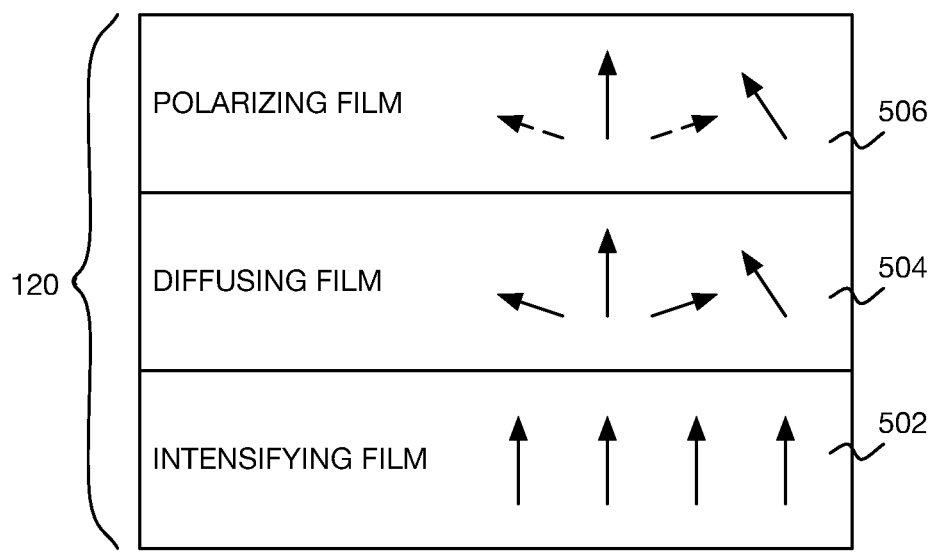
FIG. 5 is a diagram of an example optical layer of the device of FIG. 1.

FIG. 5 shows an example of the optical layer 120 of the device 100 in detail. The optical layer 120 can include three light-turning films: an intensifying film 502, a diffusing film 504, and a polarizing film 506. The intensifying film 502 is thus adjacent to the optical opening 130 of the light guide layer 114 of FIG. 1, whereas the polarizing film 506 is adjacent to the display layer 110 of FIG. 1. The light-turning films can be films that are impregnated with prisms that can change the direction of light passing through the films as desired. Arrows in 502 indicate the functionality that the films 502, 504, and 506 perform on light rays entering the respective films 502, 504, and 506.

The intensifying film 502 collimates light, increasing the intensity of the light as the light passes through the film 502. The intensifying film 502 therefore directs the guided light entering the film 502 from the light guide layer 114 of FIG. 1 upwards, changing the direction of the light such that the light rays are parallel to an axis that is perpendicular to the width of the films 502, 504, and 506 in FIG. 5. By changing the direction of the light so that the light rays are parallel to this axis, the intensifying film 502 intensifies the light.

The diffusing film 504 is above the intensifying film 502, and receives the directed and intensified light from the intensifying film 502. The diffusing film 504 diffuses the directed and intensified light as the light passes upwards through the film 504. The diffusing film 504 scatters the light, in other words, adding chaos to the light so that upon exit from the diffusing film 504, the light rays have differing angles from zero to nearly ninety degrees from the axis perpendicular to the width of the films 502, 504, and 506 in FIG. 5. The diffusing film 504 therefore uniformly distributes the light spatially over the plane of the optical layer 120 of FIG. 3.

The polarizing film 506 is above the diffusing film 504, and receives the diffused light from the diffusing film 504. The polarizing film 506 is a reflective polarizer. The polarizing film 506 permits light rays of the diffused light that have angles no greater than a specified angle from axis perpendicular to the width of the films 502, 504, and 506 in FIG. 5 to transmit through and exit the polarizing film 506 and enter the display layer 110 of FIG. 1. The angle may be forty-five degrees or thirty degrees, for example. However, other light rays, which have angles greater than the specified angle, are reflected back through the diffusing film 504, and thus back through the intensifying film 502 and back into the light guide layer 114 of FIG. 1 through the optical opening 130 thereof. Such light rays are indicated in FIG. 5 by dashed arrows. The polarizing film 506 ensures that the image that the display layer 110 displays optimally competes with ambient light to create a usable contrast ratio of the image.

The techniques that have been described herein therefore leverage ambient light to effectively backlight a passive transmissive display. The techniques have been described in relation to a wearable device like a smart watch or other wrist-worn device at which an image is viewed from the same direction at which ambient light is collected to display the image. However, the techniques are more generally applicable to other types of wearable devices, as well as types of devices other than wearable devices.

We claim:
1. A display assembly comprising:
   an electronic transmissive display layer to display an image viewable from above the display layer;

a light collector around the display layer to collect ambient light from above the display layer; and
a light guide layer below the display layer to guide the collected ambient light towards and through the display layer.

2. The display assembly of claim 1, further comprising:
an optical layer between the electronic transmissive display layer and the light guide layer to permit spatially uniform transmission of the collected ambient light from the light guide layer to the display layer that is at an angle no greater than a specified number of degrees relative to an axis perpendicular to the display layer.

3. The display assembly of claim 2, wherein the optical layer comprises:
a bottom light-turning film to direct the collected ambient light from the light guide layer parallel to the axis, increasing an intensity of the collected ambient light;
a middle light-turning film to diffuse the directed and intensified light from the bottom light-turning film; and
a top light-turning film to reflectively polarize the diffused light from the middle light-turning film.

4. The display assembly of claim 1, wherein the electronic transmissive display layer is an electronically controlled passive liquid crystal layer.

5. The display assembly of claim 1, wherein the light collector comprises:
a plurality of walls having internal reflective surfaces;
a first opening of the walls optically open to an ambient environment to collect the ambient light within the ambient environment; and
a second opening of the walls adjacent to the light guide layer to output the collected ambient light to the light guide layer.

6. The display assembly of claim 1, wherein the light collector has an optical opening disposed around a perimeter of the display layer.

7. The display assembly of claim 1, wherein the light guide layer comprises:
a plurality of walls having internal reflective surfaces;
a first opening of the walls and adjacent to the light collector to receive the collected ambient light from the light collector; and
a second opening of the walls and adjacent to the display layer to output the collected ambient light to the display layer.

8. The display assembly of claim 1, wherein the display assembly lacks an active light source for the display layer.

9. An apparatus comprising:
a housing having a top opening, and a sidewall and a bottom surface defining a cavity;
an electronic transmissive display layer within the cavity to display an image viewable from the top opening of the housing;
a light collector within the cavity and having an optical opening at the top opening of the housing and disposed around an interior perimeter of the housing to collect ambient light;
a light guide layer within the cavity to guide the collected ambient light towards and through the display layer; and
a processing device within the cavity to generate data to display using the display layer.

10. The apparatus of claim 9, further comprising:
a one-way optical film at the top opening of the housing.

11. The apparatus of claim 10, wherein the one-way optical film covers the top opening except where the optical opening of the light collector is disposed.

12. The apparatus of claim 11, wherein the optical opening of the light collector is a top optical opening of the light collector,
and wherein the light guide layer is positioned at the bottom surface of the housing, optically connecting the light collector at a bottom optical opening of the light collector to a bottom of the display layer.

13. The apparatus of claim 12, further comprising:
a bottom light-turning film above the light guide layer to direct the collected ambient light from the light guide layer upwards and to increase an intensity of the collected ambient light;
a middle light-turning film above the bottom light-turning layer to diffuse the directed and intensified light from the bottom light-turning film upwards; and
a top light-turning film between the middle light-turning film and the display layer to reflectively polarize the diffused light from the middle light-turning film upwards.

14. The apparatus of claim 12, wherein the processing device is disposed between the light collector and the display layer above the light guide layer, and the one-way optical film optically hides the processing device.

15. The apparatus of claim 9, wherein the processing device is to one or more of:
receive user input at the apparatus and is to generate the data to display using the display layer from the user input; and
receive wirelessly transmitted data via a radio and is to generate the data to display using the display layer from the wirelessly transmitted data.

16. The apparatus of claim 9, further comprising:
a protective cap extending over the top opening of the housing;
an air gap between the protective cap and the electronic transmissive display layer; and
an analog watch mechanism positioned within the air gap between the protective cap and the electronic transmissive display layer.

* * * * *